United States Patent [19]

Ioroi et al.

[11] Patent Number: 5,200,887
[45] Date of Patent: Apr. 6, 1993

[54] POWER SUPPLY UNIT FOR ARC PROCESSING

[75] Inventors: Hirokazu Ioroi, Settu; Narumi Fukumoto, Osaka; Yoshihiro Fukuju; Masahi Horii, both of Takatsuki; Kikuo Terayama, Kawabe, all of Japan

[73] Assignee: Daihen Corporation, Japan

[21] Appl. No.: 784,564

[22] Filed: Oct. 29, 1991

[30] Foreign Application Priority Data

Jun. 28, 1991 [JP] Japan .................................. 3-185628

[51] Int. Cl.⁵ .............................................. H02M 7/04
[52] U.S. Cl. ...................................... 363/143; 363/37; 363/126; 323/299
[58] Field of Search ...................... 323/299; 363/34, 37, 363/125-129, 143

[56] References Cited

U.S. PATENT DOCUMENTS 4,268,899 5/1981 Rokas ..................... 363/61
4,658,345 4/1987 Ingman ................... 363/143
4,937,731 6/1990 Konopka ................. 363/143

Primary Examiner—Emanuel T. Voeltz
Attorney, Agent, or Firm—Scully, Scott, Murphy & Presser

[57] ABSTRACT

A power supply for arc processing which can be used with a commercial AC power supplying either a high or low voltage, with the low and high voltages having a ratio of 1:2. The power supply includes two or three rectifying circuits connected in parallel, each of which comprises three series diodes, with a first series connection point of each series connected diodes being connected to one of the input terminals (phases) of the commercial power supply. The power supply further includes two or three voltage change over circuits, comprising a capacitor and a voltae change-over switch, closed at a low voltage input, connected between a second connection point of its corresponding rectifying circuit and the first connection point of another rectifying circuit. An inverter circuit for inverse conversion is connected in parallel between the terminals of the three rectifying circuits.

5 Claims, 9 Drawing Sheets

POWER SUPPLY UNIT FOR ARC PROCESSING

BACKGROUND OF THE INVENTION

The present invention relates to a power supply unit for arc processing which is so arranged that an input power of commercial AC power supply of three phase or single phase is rectified into a DC power, and thereafter, inversely converted into a high frequency AC by an inverter circuit, and the high frequency AC power obtained by the inverse conversion is reconverted into a power supply suitable for arc processing through a transformer and a rectifying circuit.

Conventionally, in the arc processing power supply unit usable commonly for high and low voltage powers of a ratio of approximately 1:2 such as commercial power voltages 200 V and 400 V or 230 V and 460 V, a power supply system directly transforming a commercial power into a predetermined voltage can cope with different power supply voltages by changing over the turn ratio of the transformer. However, in the system which is so arranged that a commercial power supply, after being rectified into DC, is inversely converted into AC of a high frequency through an inverter circuit, thereby to convert the high frequency AC into a desired voltage through a transformer, the system changing over the turn ratio is required to use switching elements and diodes having dielectric strengths sufficient to withstand 400 V (or 430 V) and capacities sufficient to withstand a large current at the time of 200 V (or 230 V) in the inverter circuit and rectifying circuit located in the power supply side thereof, which results in a large-sized and expensive circuit and offsets the effect of down-sizing the transformer and the smoothing circuit for subsequent rectifying circuit obtained by raising a frequency through the inverter circuit.

Furthermore, there is also proposed a system so arranged that with respect to the DC voltage output after rectification, a half-bridge type inverter circuit is constituted by two series-connected capacitors and two switching devices at a higher voltage time thereof, and a full-bridge type inverter circuit is constituted by four switching devices at a lower voltage time thereof so that the voltage applied to each switching device constituting the inverter circuit and the output voltage of the inverter circuit may become equal in both cases.

FIG. 1 is a connection diagram showing the conventional unit employing said system, which includes rectifying diodes 1a, 1b, 2a, 2b, 3a, and 3b for full wave rectifying a three phase AC power supply from input terminals U, V and W, capacitors 4a, 4b for smoothing the outputs of diodes 1a to 3b and dividing the output voltage into two partial voltages, switching devices 5a to 5d connected in a bridge with respective series-connection points thereof being connected to a lower voltage contact point of a change-over switch 6 and a primary winding of an output transformer 7, the change-over switch 6 with its higher voltage contact point being connected to the series connection point of the capacitors 4a, 4b and its common contact point being connected to the primary winding of the output transformer 7, and a load 8 connected to the secondary winding of the transformer 7 such as a rectifying circuit and an arc processing load or a rectifying circuit, a low frequency inverter circuit and an arc processing load.

In the unit of FIG. 1, when the three-phase power supply is of 200 V (or 230 V), the change-over switch 6 is connected to the side (a) and switching devices 5a to 5d operate as inverters connected in a bridge, and the primary winding of the output transformer 7 is connected between the connection point of switching devices 5a, 5c and the connection point of switching elements 5b, 5d. In this case, switching devices 5a and 5b, and switching devices 5c and 5d become pairs, respectively, so that respective switching devices in each pair is simultaneously on-off controlled and each pair is alternately on-off controlled by a control circuit (not shown), with capacitors 4a and 4b operating merely as smoothing capacitors.

On the other hand, when the three-phase power supply is of 400 V (or 460 V), the change-over switch 6 is connected to the side (b). In this case, the primary winding of the output transformer 7 is connected between the connection point of capacitors 4a and 4b and the connection point of switching devices 5a and 5c so as to form a half-bridge circuit. As a result, ½ of the rectifying output is applied to the transformer 7, with the same voltage output as in the case of 200 V (230 V) being obtained. In this case, switching devices 5a and 5c are on-off operated alternately, with switching elements 5b and 5d being left off.

In the conventional unit, since the same output voltage is obtained in the inverter circuit even when the voltage of the AC input power supply is changed approximately at a ratio of 1:2, the dielectric strength corresponding to the lower voltage is sufficient for the dielectric strength of the switching device in the inverter circuit, but two switching devices become idle in the case of high voltage input, and diodes 1a to 3b constituting the input side rectifying circuit are required to withstand the input voltage of 400 V and the input current at 200 V input. Furthermore, since the constitution of the inverter circuit is changed over between a full bridge system and a half bridge system by the change-over switch 6, the wiring for the inverter circuit becomes long and complicated, the inductance and floating capacity of the wiring is increased. Therefore, when the inverters are operated at a high frequency, the higher surge voltage generated at on-off of switching devices, and the countermeasure and the capacity of the surge absorption circuit require switching devices of a large capacity.

SUMMARY OF THE INVENTION

An essential object of the present invention is therefore to provide an arc processing power supply unit capable of solving these problems.

In order to achieve the aforementioned objective, according to the present invention, there is provided an arc processing power supply unit which is so arranged that the rectifying circuit for rectifying a three-phase AC to obtain a DC power supply is devised to become a voltage doubler rectifying circuit at the time of lower voltage input, and a full-wave rectifying circuit at the time of higher voltage input so as to obtain the same rectifying output voltage as in the case of higher voltage input in either of two power supplies having AC input voltages of an approximately 1:2 voltage ratio, and thereby wastes in the rectification circuit and inverter circuit are eliminated and no increase of surge voltage in the inverter circuit takes place.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 2:
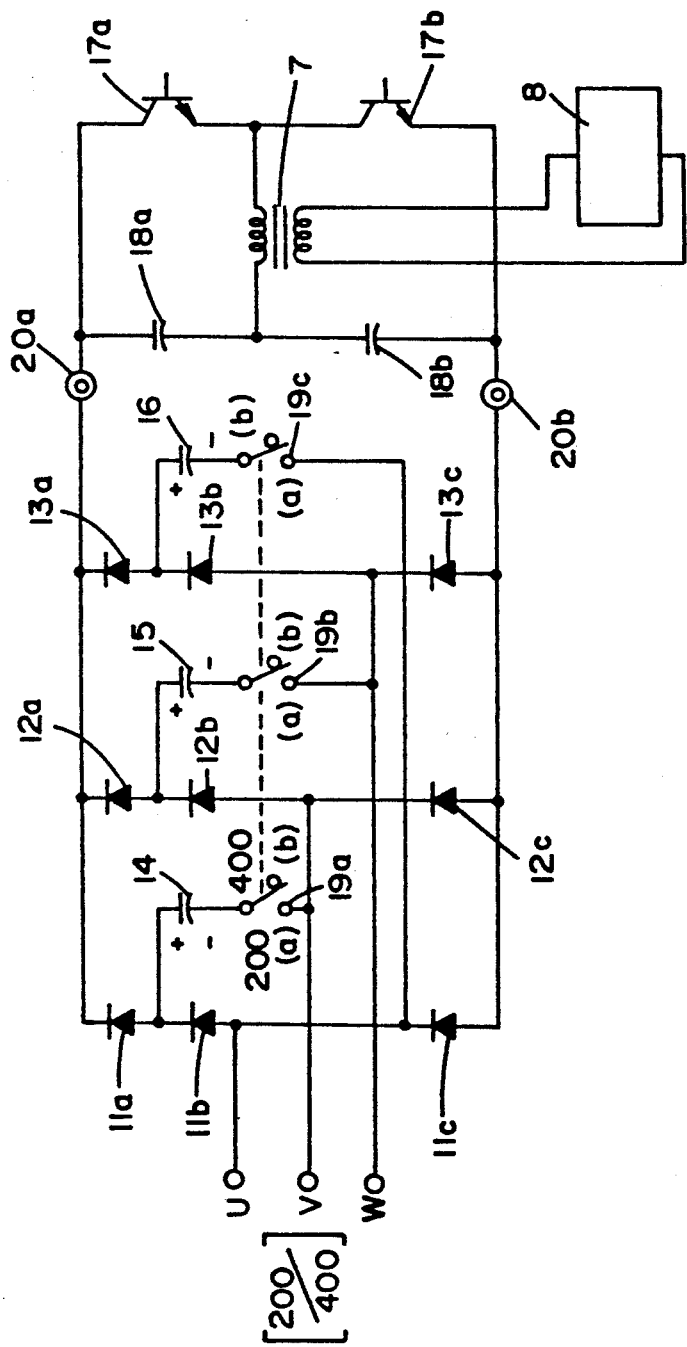
FIG. 2 is a connection diagram showing a preferred embodiment of the present invention.

FIG. 2 shows a connection diagram of a preferred embodiment of the present invention, which includes diodes 11a to 11c, 12a to 12c, and 13a to 13c, capacitors 14 to 16, 18a and 18b, switching devices 17a and 17b, voltage change-over switches 19a to 19c which operate at the same time with each other, an output transformer 7, and a load 8 of the output transformer 7 which is an arc load including, as in the conventional apparatus, a rectifying circuit, electrodes, an arc and a work to be processed or a rectifying circuit, a low frequency inverter circuit and an arc load. In FIG. 2, when change-over switches 19a to 19c are held at the side (a), namely, on the 200 V side (lower voltage side), a voltage doubler rectifying circuit is constituted by diodes 11a to 13c and capacitors 14 to 16.

On the other hand, when change-over switches 19a to 19c are held at the side (b), namely, 400 V side (higher voltage side), capacitors 14 to 16 are cut off from the circuit, and a three phase full wave rectifying circuit is constituted by diodes 11a to 13c.

Capacitors 18a and 18b are capacitors for dividing the rectified output into two equal parts, and the respective outputs thus divided are inversely converted into a high frequency AC by a half-bridge inverter circuit constituted by switching devices 17a and 17b on-off controlled alternately by a control circuit (not shown), and, after being converted into a desired voltage by the output transformer 7, supplied to the load 8.

Hereinafter, the operation of the embodiment of FIG. 2 will be described in detail. In FIG. 2, when change-over switches 19a to 19c are switched to the side (b), since the circuit forms a normal three phase full wave rectification circuit, further explanation is omitted. The operation when change over switches 19a to 19c are switched to the side (a) will be described with reference to the voltage waveforms of respective phases U, V, and W.

Figure 1:
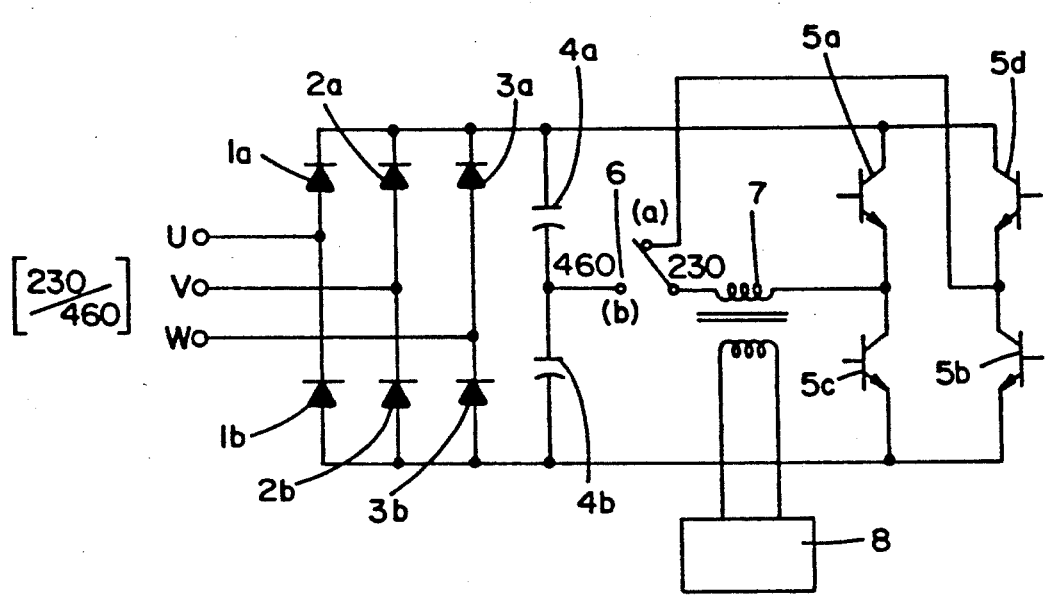
FIG. 1 is a connection diagram showing an example of the conventional apparatus.
Figure 3:
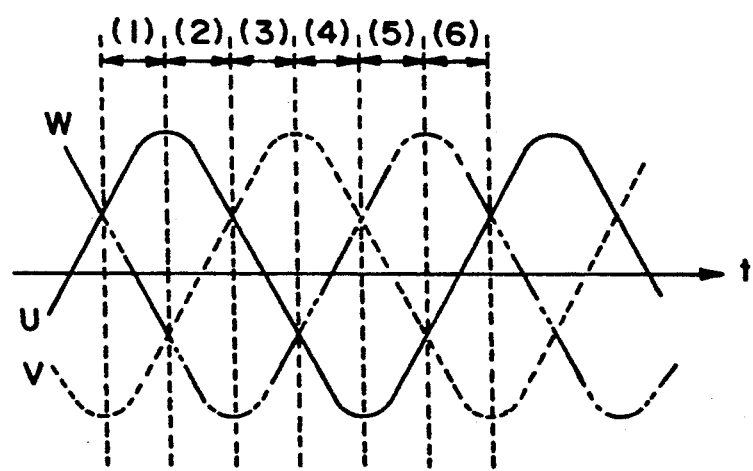
FIG. 3 is a diagram for explaining the operation of the embodiment of FIG. 2.

In FIG. 3, in the period (1), the potential of U phase is the highest and that of V phase is the lowest. Therefore, by the voltage between U and V, the capacitor 14 is charged through the diode 11b. In this case, between the output terminals 20a and 20b, a voltage between U and V is applied through a circuit of the input terminal U, change-over switch 19c, capacitor 16, diode 13a, output terminal 20a, load (inverter circuit), output terminal 20b, diode 12c, and input terminal V. It is to be noted here that the diodes 11a and 12a are reversely biased by the potential of capacitor 16 and U or V and not conductive. Here, the capacitor 16 has been charged ahead of this period (period corresponding to period (5) in FIG. 3) and its polarity is "+" at the connection point of diodes 13a and 13b, as shown in FIG. 2, that is, of the same polarity as the voltage between U and V. Therefore, the sum of these voltage is applied between output terminals 20a and 20b.

In the period (2), since the terminal voltage of the capacitor 14 is charged up to the peak value of the voltage between U and V, the capacitor 14 is not further charged but is held in this state. On the other hand, since the potential of W phase is the lowest, the sum of the voltage between W and U and a terminal voltage of the capacitor 16 is applied between output terminals 20a and 20b via the diode 13c in place of the diode 12c.

In the period (3), since the potential of V phase is the highest and that of W phase is the lowest, the capacitor 15 is charged by the voltage between V and W, and, at the same time, the sum of the terminal voltage of the capacitor 14 and the voltage between V and W is outputted.

In the period (4), charging of the capacitor 15 is stopped, and the sum of the terminal voltage of the capacitor 14 and the voltage between V and U is applied between the output terminals 20a and 20b.

In the period (5), the capacitor 16 is charged by the voltage between W and U and the sum of the terminal voltage of the capacitor 15 and the voltage between W and U is applied between the output terminals 20a and 20b.

In the period (6), charging of the capacitor 16 is stopped and the sum of the terminal voltage of the capacitor 15 and the voltage between W and V is applied between the output terminals 20a and 20b.

Said periods (1) to (6) are repeated. Since, in respective periods, the terminal voltage of respective capacitors and the power supply voltage added thereto are of the same polarity at all times and the output terminal 20a is of positive polarity, between the output terminals 20a and 20b, the output voltage equal to two times the line voltage of the AC power supply. Therefore, when the change over switches 19a to 19c are switched to the side (a) for the low voltage input of 200 V or 230 V, as well as the side (b) for the high voltage input of 400 V or 460 V, the rectification output voltage same as obtained when the voltage of 400 V or 460 V at the high voltage input is rectified in full wave can be obtained irrespective of the power supply voltage.

In the unit of FIG. 2, for the three-phase AC power supply voltages different in approximately 1:2 ratio, the rectified output is at all times the same as the full wave rectified output voltage at the high voltage input, and this DC output is divided into two equal parts, thereby to inversely convert into a high frequency AC through a half-bridge type inverter circuit. Therefore, both rectifying circuit and inverter circuit have no wastes in respect of capacity, and since the wiring of the inverter circuit is simplified, there is no increase in generation of surge voltage.

In the embodiment of FIG. 2, when the change-over switches 19a to 19c are switched the side (b), the capacitors 14 to 16 are separated from the circuit. In order to use these capacitors effectively, each side (b) contact points of the change-over switches 19a to 19c may be connected to anodes of diodes 11c, 12c and 13c and output terminal 20b, respectively.

Figure 4:
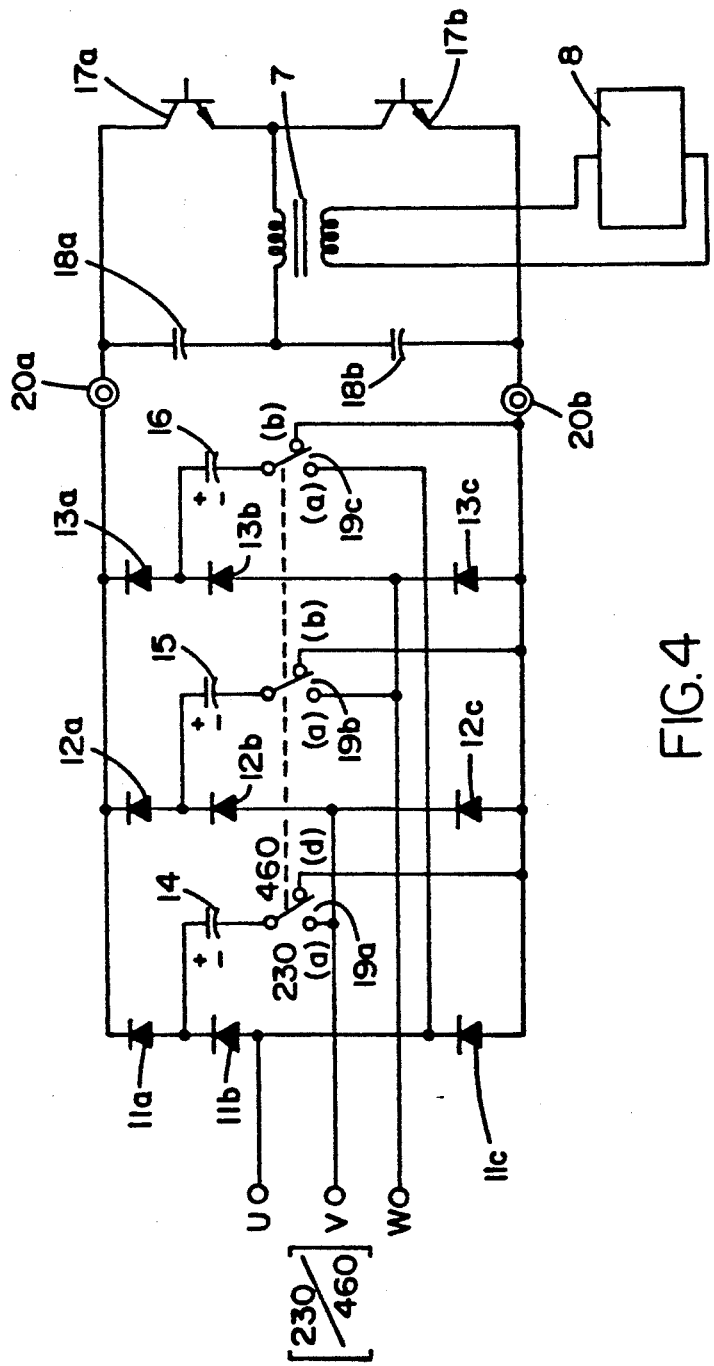
FIGS. 4 to 10 are connection diagrams showing other preferred embodiments of the present invention, respectively.

FIG. 4 is a connection diagram showing the embodiment connected in way mentioned above. In the embodiment of FIG. 4, when the change-over switches 19a to 19c are connected to the side (a), it is the same circuit as in the embodiment of FIG. 2, and when they are connected to the side (b), the capacitors 14 to 16 operate for smoothing the DC output. It is to be noted here that in FIGS. 2 and 4, although a half-bridge type inverter is constituted as the output inverter circuit by the capacitors 18a and 18b, a full-bridge type inverter circuit composed of four switching devices may be constituted by using voltages between both ends of each of the capacitors 18a and 18b. In this case, the operation is the same except that the primary voltage applied to the output transformer 7 is two times the voltage in respective embodiment in FIGS. 2 and 4.

Figure 5:
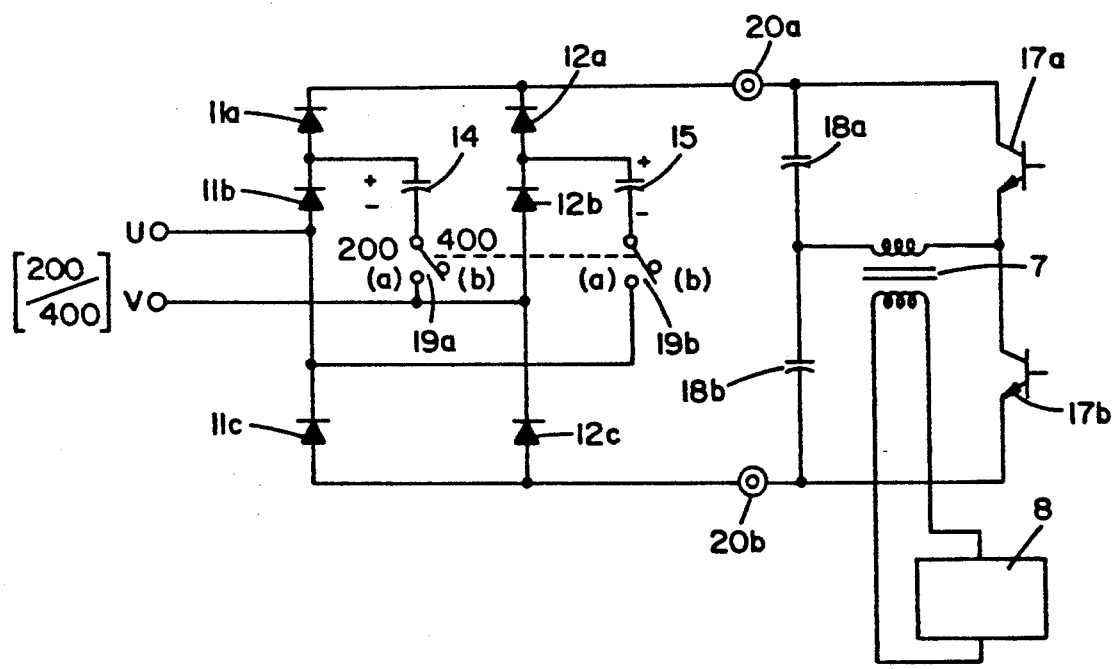

FIG. 5 is a connection diagram of a preferred embodiment in the case where the commercial AC power supply is of single phase. In FIG. 5, the connection diagram corresponds to that obtained by removing one phase (W phase) from the embodiment in FIG. 2, and the same as the embodiment in FIG. 2 except that the (a) contact point of switch 19b is connected to the connection point of diodes 11b and 11c. The operation of the embodiment in FIG. 5 is the same as that of the embodiment in FIG. 2. In other words, when the commercial power supply is of a high voltage such as 400 V or 460 V, a single phase full-wave rectifying circuit is formed by setting the change-over switches on the side (b). On the other hand, when the commercial power supply is of a low voltage such as 200 V or 230 V, a single phase voltage doubler rectifying circuit is formed by setting the change-over switches at the side (a), and therefore, in either of the input voltages of approximately 1:2 ratio, the same DC output (voltage equal to the rectified output at the high voltage input) is obtained between the terminals 20a and 20b.

Figure 6:
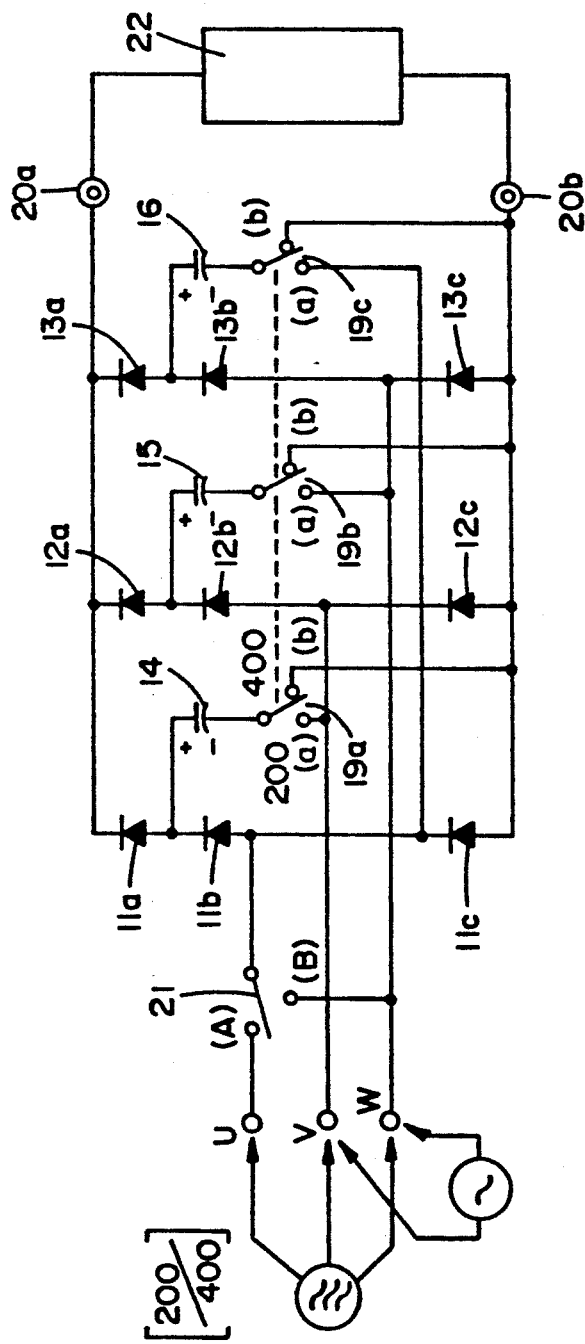

FIG. 6 is a connection diagram of a preferred embodiment which is arranged to be used commonly for three-phase and single phase commercial power supplies. In FIG. 6, when the input power supply is of single phase, the power supply is connected to 2 phases of input terminals U, V, W, and remaining one phase is opened by a change-over switch for safety, the internal circuit of that phase is connected in parallel to other phase.

In FIG. 6, a reference numeral 21 indicates a three-phase to single-phase change-over switch for changing over the input terminal between 3-phase and single-phase, and, when the power supply is a single phase, it opens the terminal U and connects the internal U terminal circuit in parallel to the terminal W. A reference numeral 22 is a load circuit composed of an inverter circuit, output transformer, output rectification circuit, and arc load etc. which is similar to the load in FIGS. 2 and 4. Furthermore, the change-over switches 19a to 19c are arranged to connect the contact point (b) to the output terminal 20b so that thease change-over switches is connected to the side (b), capacitors 14 to 16 operate as smoothing capacitors.

In the embodiment of FIG. 6, when the 3-phase to single phase change-over switch 21 is switched to the side (A), respective input terminals U, V, W become independent so as to form the same circuit as in the embodiment of FIG. 4. In this case, when a three-phase power supply is connected to respective input terminals U, V, W, it becomes the same as in the embodiment in FIG. 4, and accordingly, the explanation is omitted for this case. Subsequently, the operation in the case when a single phase power supply is connected between terminals V and W, with the 3-phase to single phase change-over switch 21 being set at the side (B) will be explained. In FIG. 6, when the 3-phase to single phase change-over switch 21 is placed on the side (B), and change-over switches 19a to 19c are placed on the side (b) (400 V side), the single phase AC power supply supplied between V and W is rectified by the full wave rectification circuit constituted by diodes 12b, 12c, and diodes 13b, 13c. At this time, diodes 11b and 11c are connected in parallel to the circuit of diodes 13b and 13c by the three-phase to single phase change-over switch 21 and effect the same operation as the normal full-wave rectification circuit.

When change-over switches 19a to 19c are on the side (a), i.e. 200 V side, voltage doubler rectifying circuit is constituted by diodes 11a to 11c, diodes 12a to 12c, diode 13c, capacitors 14 and 15. In this case, when the phase of the power supply voltage is of a positive polarity on the side of terminal V, the capacitor 15 is charged by the voltage between V and W through a path of terminal V, diode 12b, capacitor 15, change-over switch 19b, and terminal W. Simultaneously at this time, the voltage between V and W is applied between the output terminals 20a and 20b through a path of terminal V, change-over switch 19a, capacitor 14, diode 11a, output terminal 20a, load 22, output terminal 20b, diode 13c (or diode 11c, three phase to single phase change-over switch 21), terminal W, single phase power supply and terminal V. At this time, since the capacitor 14 has been charged in the polarity indicated in FIG. 6 in the previous period wherein the terminal W is of positive polarity, this charged voltage and the single phase power supply voltage at this time are added in the same polarity, and 2 times the single phase power supply voltage is applied between the output terminals 20a and 20b. Subsequently, when the polarity of the AC power supply is inverted so as to be positive on the side of terminal W, the capacitor 14 is charged through the diode 11b and simultaneously, current flows to load 22 through a path of terminal W, change-ovrr switch 19b, capacitor 15, diode 12a, output terminal 20a, load 22, output terminal 20b, diode 12c, terminal V, single phase AC power supply and terminal W. At this time, since the terminal voltage of the capacitor 15 and power supply voltage have the same polarity, as shown in FIG. 6, these voltages are added and applied between the output terminals 20a and 20b.

By said arrangement, when the three-phase to single phase change-over switch 21 is changed over to the side (B), i.e. single phase side, in the case of 200 V (or 230 V) power supply voltage, the DC output by a voltage doubler rectifying circuit is applied between the output terminals 20a and 20b, while in the case of 400 V (or 460 V) power supply voltage, the DC voltage by the full wave rectification is supplied between the output terminals 20a and 20b. Accordingly, irrespective of the high or low voltage power supply, the same output voltage can be obtained, and thereby the load circuit of the same voltage rating can be used.

It is to be noted in FIG. 6 that when change-over switches 19a to 19c are changed over to the side (a), i.e. the low voltage side, and the three-phase to single phase changeover switch 21 is changed over to the side (B), i.e. the single phase side, the capacitor 16 is connected in parallel to the diode 13b irrespective polarity of the power supply voltage, and does not function in the circuit, with no charging or discharging being effected.

Figure 7:
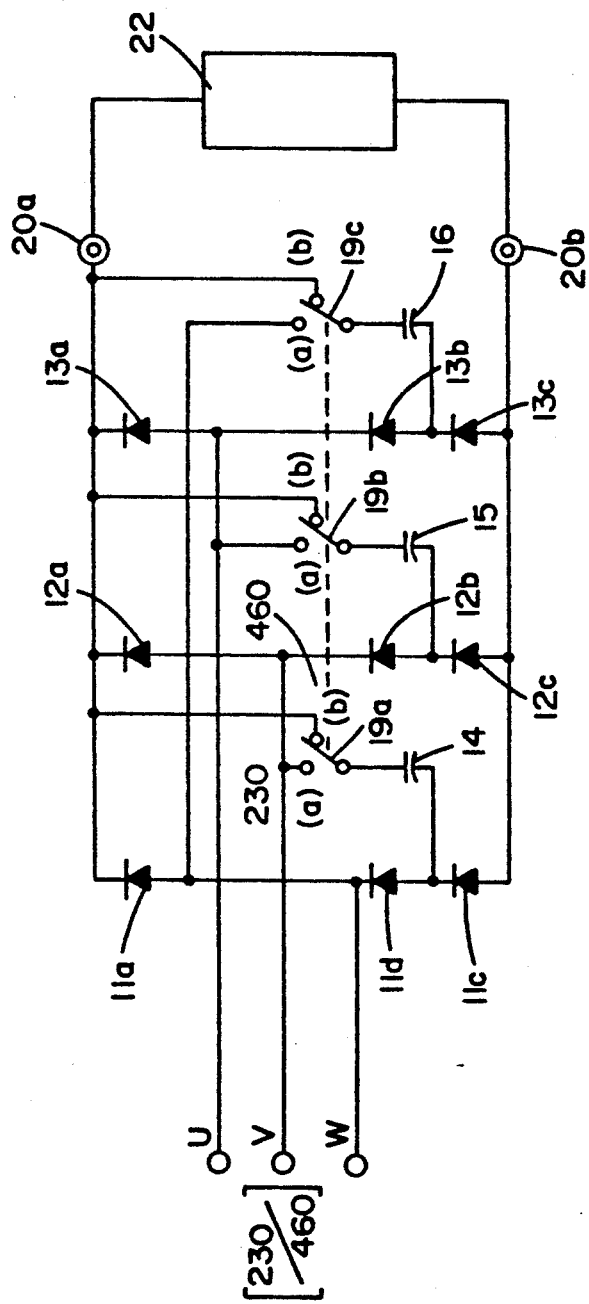
Figure 8:
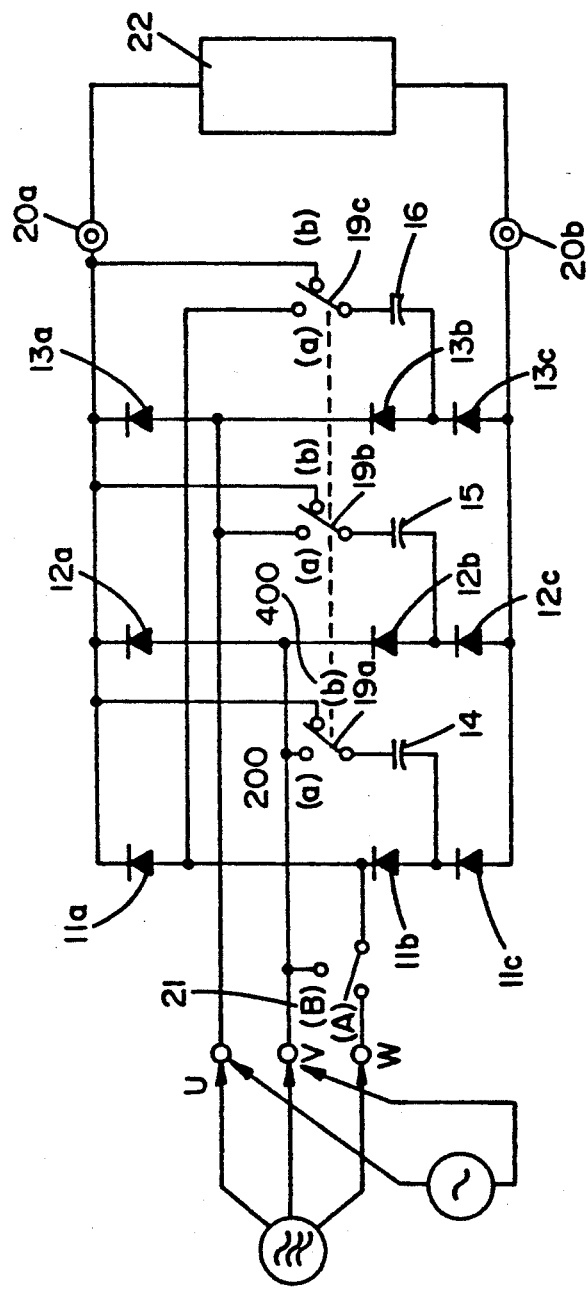

It is to be noted here that the connection between the capacitors 14 to 16 and respective diodes is not limited to the connections shown said respective embodiments, but the connections shown in FIGS. 7 and 8 may provide the apparatus of the same function.

FIG. 7 is a connection diagram of an example in which the positional relation between capacitors and diodes is changed in the embodiment of FIG. 4, and FIG. 8 is a connection diagram of an example in which similar change is made in the embodiment of FIG. 6. In FIGS. 7 and 8, the operation is the same as the respective embodiments shown in FIGS. 4 and 6.

Figure 9:
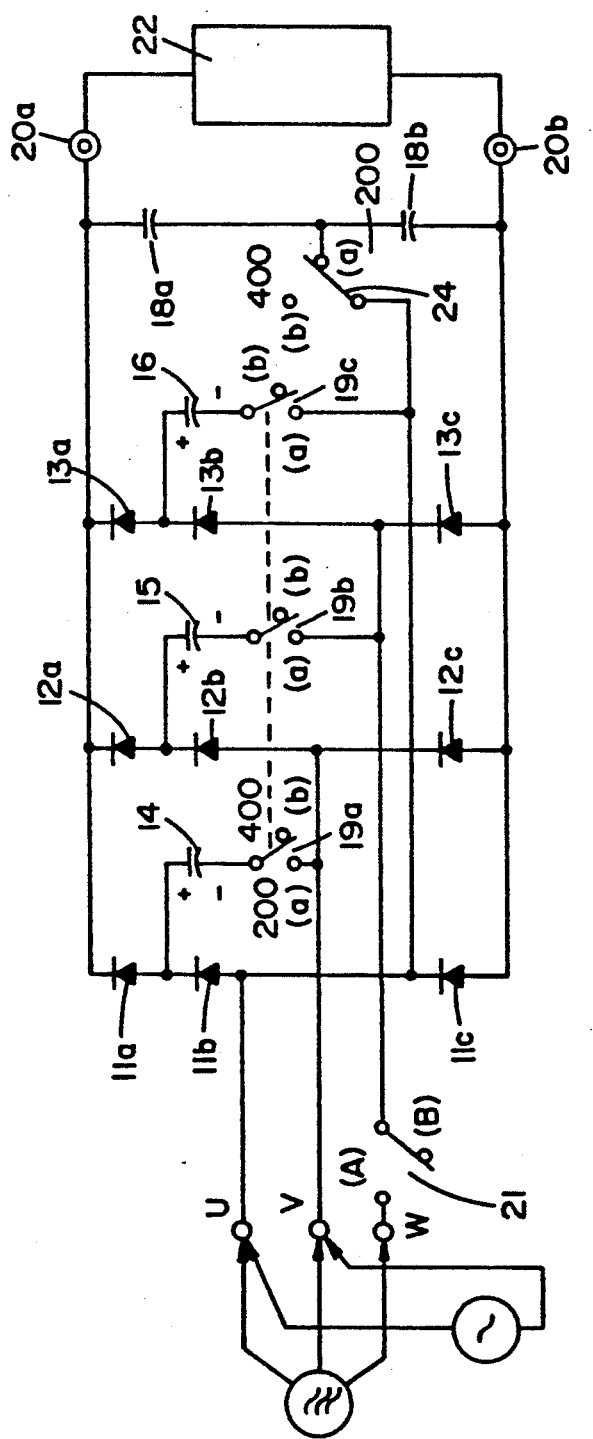

FIG. 9 is a connection diagram showing another preferred embodiment of the present invention which is arranged to cope with change-over between three phase and single phase and four kinds of power supplies, i.e. three phase 200 V/400 V, single phase 200 V/400 V by using three kinds of change-over switches.

In FIG. 9, there are shown a three phase to single phase change-over switch 21, a single phase 200 V to a single phase 400 V or three phase change-over switch 24, and three phase 200 V to three phase 400 V or single phase change-over switches 19a to 19c. When the change-over switch 24 is changed over to the side (b) (single phase 400 V or three phase side) and the change-over switch 21 is changed over to the side (A) (three phase side), it is suitable for the three phase power supply. In this state, when the change-over switches 19a to 19c are connected to the side (a), a circuit as the same as that of the embodiment shown in FIG. 2 is constituted, which is suitable for three phase 200 V power supply, while, when change-over switches 19a to 19c are changed over to the side (b) (three phase 400 V or single phase side), it is suitable for the three phase 400 V power supply, and when the change-over switch 21 is changed over to the side (B) (single phase side) and the change-over switches 19a to 19c are changed over to the side (b), it is switable for single phase power source. In this case, when the change-over switch 24 is connected to the side (a) (single phase 200 V side), the circuit is suitable for the single phase 200 V power supply, while it is connected to the side (b) (single phase 400 V or three phase side), the circuit is suitable for the single phase 400 V power supply. In other words, in the state when the switch 24 is changed over to the side (b), the change-over switch 21 is changed over to (A) (three phase side) and switches 19a to 19c are connected to the side (a), a three phase voltage doubler rectifying circuit is constituted by diodes 11a to 11c, diodes 12a to 12c, diodes 13a to 13c, and capacitors 14 to 16. When the change-over switch 24 is changed over to the side (b), the switch 21 is changed over to (A), and switches 19a to 19c are connected to the side (b), the capacitors 14 to 16 are cut off from the circuit, and a three phase full-wave rectifying circuit is constituted. When the switch 21 is connected to (B) (single phase side), W phase input terminal is cut off. In this state, when switches 19a to 19c are connected to the side (b) and the switch 24 is connected to the side (a), a single phase voltage doubler rectifying circuit is constituted by the diodes 12a to 12c and the capacitors 18a and 18b. Further, when the switch 24 is connected to the side (b), a single phase full-wave rectifying circuit is constituted by the diodes 11a to 11c and the diodes 12a to 12c. As a result, by changing over change-over switches 19a to 19c, change-over switches 21 and 24 in accordance with AC commercial power supplies, irrespective of the three phase or single phase of the input power supply, an approximately same DC voltage is supplied to the load circuit 22 at input of 200 V or 400 V.

Figure 10:
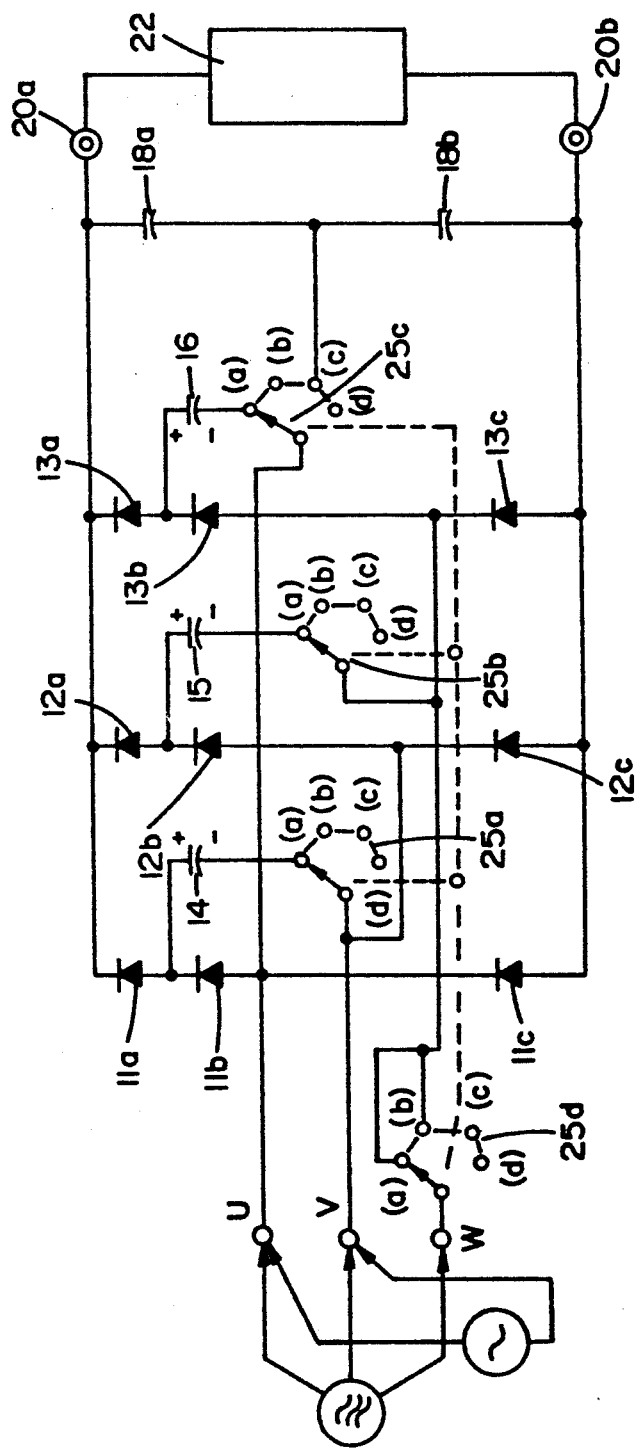

FIG. 10 is a connection diagram showing a further embodiment of the present invention, which is arranged to cope with four kinds of power supplies three phase 200 V/400 V and single phase 200 V/400 V by using switches of four steps. In FIG. 10, switches 25a to 25d are change-over switches of four steps which are interlocked with each other, and respectively connected in series between capacitors 14, 15, 16, respective in-series connection points of diodes 12b and 12c, diodes 13b and 13c, diodes 11b and 11c, capacitors 18a and 18b; and input terminals. When 4-stepped switches 25a to 25d are connected to the contact points (a) and (b), the circuit becomes the same as in the embodiment shown in FIG. 2, and at the contact point (a), the circuit is suitable for the three phase 200 V power supply, while at the contact point (b), it is suitable for the three phase 400 V power supply. Meanwhile, the 4-stepped switches 25a to 25d are connected to contact points (c) and (d), the circuit become suitable for the single phase power supply, and becomes the same circuit as that in the embodiment shown in FIG. 6 wherein the single phase power supply is connected to input terminals U and V. In this case, when connected to the contact point (c), the circuit is suitable for the single phase 200 V power supply, while, connected to the contact point (d), the circuit is suitable for 400 V single phase power supply. In other words, When change-over switches are connected to the contact points (a), a three phase voltage doubler rectifying circuit is constituted by diodes 11a to 11c, diodes 12a to 12c, diodes 13a to 13c, and capacitors 14 to 16. When switches are connected to contact points (b), a three phase full wave rectifier circuit is constituted with the capacitors 14 to 16 being cut off. When the change-over switches are connected to the contact points (c), the input terminal W phase is cut off and the inseries connection point of capacitors 18a and 18b is connected to U phase. At this time, a single phase voltage doubler rectifying circuit is constituted by diodes 12a to 12c and capacitors 18a and 18b. Furthermore, when connected to the contact points (d), a single phase full-wave rectifying circuit is constituted by diodes 11a to 11c and diodes 12a to 12c. As a result, as in the embodiment in FIG. 10, by changing over the change-over switches 25a to 25d, an approximately same DC voltage is supplied to the load circuit 22 irrespective of input power supply of three phase or single phase and at input voltage of 200 v or 400 V.

It is to be noted hear that, although systems of changing over the phase and voltage of input power supply by using change-over switches are shown in the above embodiments, since these change-over are not made frequently, it may be so modified that in place of the change-over switches, respective connection points are drawn out to a terminal board and respective connection change-over are made by changing connection of connection bar.

Furthermore, in respective embodiments in FIGS. 6, 8, 9 and 10 which are applicable commonly to power supplies of three phase and single phase, the terminals to be connected to the single phase power supply are not limited to those illustrated, but needless to say, any two terminals of three phase input terminals U, V, and W may be taken.

As is clear from the foregoing description, according to the present invention, in the two AC power supply voltages of approximately 1:2 ratio, the rectified DC output thereof becomes, at all times, a voltage equal to the full wave rectification voltage at the time of high voltage input, and said obtained voltage is divided into two equal parts by two in-series capacitors for processing by a half-bridge type inverter circuit employing two switching devices, or said obtained voltage is processed as it is by a full-bridge type inverter circuit, thereby to obtain a high frequency AC. Accordingly, it is not necessary to increase the current and voltage ratings of the rectifier circuit and inverter circuit wastefully, and there is no change-over circuit due to the input power supply voltage in the inverter circuit and the circuit becomes simple, with no increase being made in the surge voltage taking place in switching.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A power supply unit for arc processing for a three-phase or single-phase commercial AC power, in which either of high or low voltage inputs of approximately 1:2 ratio is selectively supplied as an input, the AC input is, after being rectified into DC power, inversely converted into a high frequency AC by an inverter circuit employing switching elements, and the inversely converted high frequency AC power is converted into a power suitable for arc processing, comprising:

a plurality of rectifying circuits, the number of which is equal to the number of phases of the commercial power supply, said plurality of rectifying circuits being connected in parallel and each rectifying circuit comprising three diodes connected in series by connection points between the three series connected diodes;

the AC power having input terminals and each input terminal of the commercial power supply being connected to a first one of the series connection points of the three diodes forming a corresponding rectifying circuit;

a plurality of input voltage change-over circuits, the number of which is equal to the number of phases of the commercial power supply, each voltage change-over circuit comprising a capacitor and a voltage change-over switch connected in series between a second one of the series connection points of the three diodes forming the corresponding rectifying circuit and the first series connection point of one of the other rectifying circuits; and said inverter circuit is connected between output terminals connecting the plurality of rectifying circuits in parallel.

2. A power supply unit for arc processing as claimed in claim 1, wherein each of the said change-over switches connects the corresponding capacitor between the first series connection point of the corresponding rectifying circuit and the second series connection point of one of the other rectifying circuits at the low voltage input and, at the high voltage input, connects the corresponding capacitor between the second series connection point of the corresponding rectifying circuit and one of the output terminals.

3. A power supply unit for arc processing as claimed in claim 1 or 2, including three rectifying circuits, and a three phase to single phase change-over switch is provided between the first series connection point of one of said rectifying circuits and the corresponding input terminal of said commercial power supply, said change-over switch cutting off the corresponding input terminal and connecting the first series connection point to one of the first series connection points of the other two rectifying circuits when said power supply is single phase.

4. A power supply unit for arc processing as claimed in claim 1, wherein said inverter circuit is a half bridge type inverter circuit in which the main circuit comprises two series capacitors for dividing voltage and two series switching elements.

5. A power supply unit for arc processing for a commercial AC power supply, in which either of high or low voltages inputs of approximately 1:2 ratio is selectively supplied as an input, the AC input is, after being rectified into DC power, inversely converted into a high frequency AC power by an inverter circuit employing switching elements, and then converted into a power suitable for arc processing comprising:

three rectifying circuits connected in parallel, and each rectifying circuit comprising three diodes connected in series by connection points between the three series connected diodes;

the AC power supply having input terminals and each input terminal of the commercial power supply being connected to a first one of the series connection points of the three diodes forming a corresponding rectifying circuit;

two capacitors connected by a connecting point and arranged in series between two output terminals of the three rectifying circuits;

three input voltage change-over circuits, each of which comprises a capacitor and a voltage change-over switch connected in series between a second one of the series connection points of the three diodes forming the corresponding rectifying circuit and the first series connection point of one of other rectifying circuits, each voltage change-over switch being closed at the low voltage input and opened at the high voltage input;

a single phase input voltage change-over circuit arranged to connect a connection point of the two series capacitors to one of the input terminals and to cut off one of the remaining input terminals at a single phase low voltage input, and to cut off the connection with said capacitors at a single phase high voltage input; and an inverter circuit for said inverse conversion connected in parallel to the two series capacitors.

* * * * *